US012770364B2

(12) United States Patent
Yoshida et al.

(10) Patent No.: US 12,770,364 B2
(45) Date of Patent: Oct. 20, 2026

(54) IMAGE PROCESSING SYSTEM, IMAGE PROCESSING METHOD, AND NON-TRANSITORY COMPUTER-READABLE MEDIUM

(71) Applicant: NEC Corporation, Tokyo (JP)

(72) Inventors: Noboru Yoshida, Tokyo (JP); Ryo Kawai, Tokyo (JP); Jianquan Liu, Tokyo (JP); Kazuki Ogata, Tokyo (JP); Naoki Sugaya, Tokyo (JP); Nobuyuki Tozawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 218 days.

(21) Appl. No.: 18/711,663

(22) PCT Filed: Dec. 8, 2021

(86) PCT No.: PCT/JP2021/045065
§ 371 (c)(1),
(2) Date: May 20, 2024

(87) PCT Pub. No.: WO2023/105666
PCT Pub. Date: Jun. 15, 2023

(65) Prior Publication Data
US 2025/0014312 A1 Jan. 9, 2025

(51) Int. Cl.
*G06V 10/74* (2022.01)
*G06V 10/86* (2022.01)
(Continued)

(52) U.S. Cl.
CPC ............ *G06V 10/761* (2022.01); *G06V 10/86* (2022.01); *G06V 20/52* (2022.01); *G06V 40/10* (2022.01); *G06V 10/20* (2022.01)

(58) Field of Classification Search
None
See application file for complete search history.

(56) References Cited

U.S. PATENT DOCUMENTS 11,003,949 B2 * 5/2021 Lan ........................ G06V 10/82
11,706,391 B1 * 7/2023 Heywood ............ G08B 25/006 348/158

FOREIGN PATENT DOCUMENTS

JP 2002-183216 A 6/2002
JP 2011-035571 A 2/2011
(Continued)

OTHER PUBLICATIONS

Manzi et al. "Two-person activity recognition using skeleton data" (Year: 2017).*
(Continued)

*Primary Examiner* — Sj Park
(74) *Attorney, Agent, or Firm* — Sughrue Mion, PLLC

(57) ABSTRACT

An image processing system includes a first terminal and a second terminal communicably connected to each other. The first terminal includes an image data acquisition unit configured to acquire image data related to an image of a predetermined space from a camera that photographs the predetermined space. At least one of the first terminal or the second terminal includes an analysis unit configured to analyze whether skeletal data relating to a structure of a body of a person included in the image are similar to predetermined reference skeletal data. The second terminal includes a detection unit configured to detect a predetermined event based on a result of the analysis, and an output unit configured to output result information that is a result of the detection.

10 Claims, 18 Drawing Sheets

(51) Int. Cl.

| | |
|---|---|
| ***G06V 20/52*** | (2022.01) |
| ***G06V 40/10*** | (2022.01) |
| *G06V 10/20* | (2022.01) |

(56) References Cited

FOREIGN PATENT DOCUMENTS

| | | | |
|---|---|---|---|
| JP | 2014-194686 | A | 10/2014 |
| JP | 2017-069748 | A | 4/2017 |
| JP | 2018-160219 | A | 10/2018 |
| JP | 2019-009529 | A | 1/2019 |
| JP | 2021-077295 | A | 5/2021 |
| JP | 2021-132267 | | 9/2021 |

OTHER PUBLICATIONS

Li et al., "Multiview skeletal interaction recognition using active joint interaction graph" (Year: 2016).*

International Search Report for PCT Application No. PCT/JP2021/045065, mailed on Feb. 15, 2022.

* cited by examiner

| REGISTERED MOTION ID | RELATED WORD | | |
|---|---|---|---|
| R01 | RUNNING | HURRYING | ・・・ |
| R02 | WALKING | SLOW | ・・・ |
| R03 | SITTING IN | SQUATTING | ・・・ |
| R04 | SITTING IN | CROUCHING DOWN | ・・・ |
| ⋮ | ⋮ | ⋮ | ⋮ |

Fig. 9

MOTION ID = R03 (SITTING IN)

F31

| REGISTERED MOTION ID | EVENT |
| --- | --- |
| R01, R11 | SNATCH-AND-GRAB |
| R02, R12, R22 | FIGHT |
| R03, R13 | MEETING |
| ⋮ | ⋮ |

Fig. 15

IMAGE PROCESSING SYSTEM, IMAGE PROCESSING METHOD, AND NON-TRANSITORY COMPUTER-READABLE MEDIUM

This application is a National Stage Entry of PCT/JP2021/045065 filed on Dec. 8, 2021, the contents of all of which are incorporated herein by reference, in their entirety.

TECHNICAL FIELD

The present disclosure relates to an image processing system, an image processing method, and a non-transitory computer-readable medium.

BACKGROUND ART

A technique for monitoring a wide area such as a city by installing a plurality of cameras in the area has been developed.

For example, in a technique of Patent Literature 1, a person in an image input from a camera is tracked, it is determined whether an action of the person is a non-routine action, it is determined whether the action of the person is a suspicious specific action, and the suspicious action of the person is detected based on the determination result.

A technique of Patent Literature 2 classifies objects existing in a detection area into a pedestrian and a vehicle from object information of the objects existing in the detection area, and sets the pedestrian and the vehicle as monitoring targets when it is determined that there is a possibility that the pedestrian and the vehicle move to the same position at the same time.

In a technique of Patent Literature 3, when a person who is not included in a list of face images of persons but satisfies a predetermined criterion is detected from received image information, a face image of the person who satisfies the predetermined criterion is added to the list and an identifier of the added face image is output.

CITATION LIST

Patent Literature

Patent Literature 1: Japanese Unexamined Patent Application Publication No. 2011-035571
Patent Literature 2: Japanese Unexamined Patent Application Publication No. 2014-194686
Patent Literature 3: Japanese Unexamined Patent Application Publication No. 2019-009529

SUMMARY OF INVENTION

Technical Problem

With regard to a technique for monitoring a space by installing a plurality of cameras as described above, a technique capable of efficiently dealing with various events is expected.

In view of the problem described above, an object of the present disclosure is to provide an image processing system and the like capable of efficiently processing an image photographed by a plurality of cameras.

Solution to Problem

An image processing system according to one aspect of the present disclosure includes a first terminal and a second terminal that are communicably connected to each other. The first terminal includes image data acquisition means for acquiring image data related to an image of a predetermined space from a camera that photographs the predetermined space. At least one of the first terminal or the second terminal includes analysis means for analyzing whether skeletal data relating to a structure of a body of a person included in the image are similar to predetermined reference skeletal data. The second terminal includes: detection means for detecting a predetermined event based on a result of the analysis; and output means for outputting result information that is a result of the detection.

In an image processing method according to one aspect of the present disclosure, an image processing system including a first terminal and a second terminal that are communicably connected to each other executes the following processing. The first terminal acquires image data related to an image of a predetermined space from a camera that photographs the predetermined space. At least one of the first terminal or the second terminal analyzes whether skeletal data relating to a structure of a body of a person included in the image are similar to predetermined reference skeletal data. The second terminal detects a predetermined event based on a result of the analysis, and outputs result information that is a result of the detection.

A non-transitory computer-readable medium according to one aspect of the present disclosure is a program that causes an image processing system including a first terminal and a second terminal that are communicably connected to each other to execute the following image processing method. The first terminal acquires image data related to an image of a predetermined space from a camera that photographs the predetermined space. At least one of the first terminal or the second terminal analyzes whether skeletal data relating to a structure of a body of a person included in the image are similar to predetermined reference skeletal data. The second terminal detects a predetermined event based on a result of the analysis, and outputs result information that is a result of the detection.

Advantageous Effects of Invention

According to the present disclosure, it is possible to provide an image processing system and the like capable of efficiently processing images photographed by a plurality of cameras.

BRIEF DESCRIPTION OF DRAWINGS

FIG. 9 is a diagram for explaining a registered motion database according to the second example embodiment.

FIG. 15 is a diagram for explaining a registered motion database according to the fourth example embodiment.

EXAMPLE EMBODIMENTS

Figure 1:
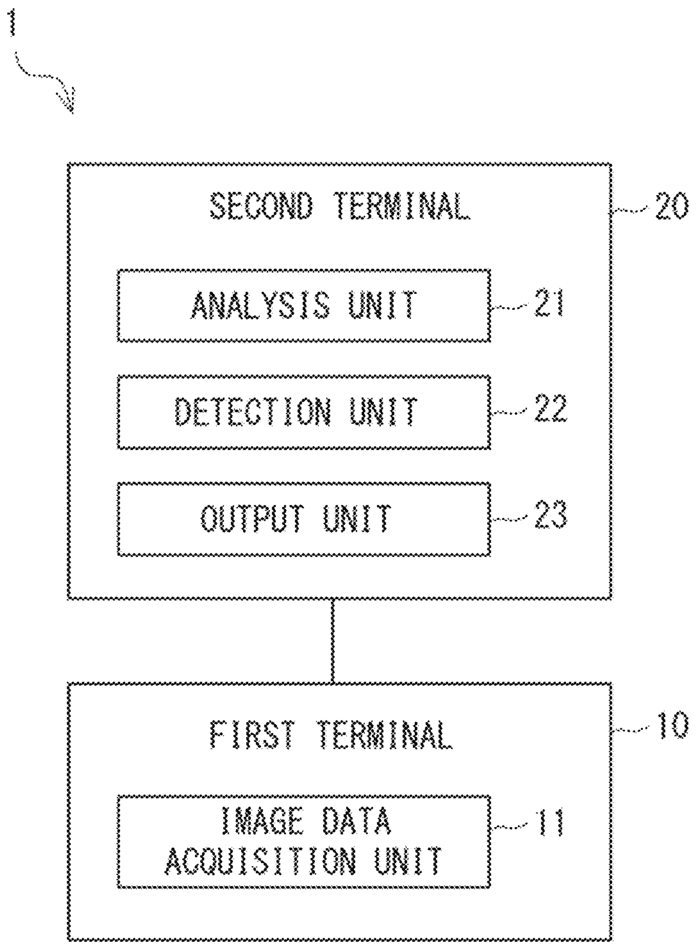
FIG. 1 is a block diagram illustrating a configuration of an image processing system according to a first example embodiment.

Hereinafter, the present disclosure will be described through example embodiments, but the disclosure according to the claims is not limited to the following example embodiments. Further, all of the configurations to be described in the example embodiments are not essential as means for solving the problem. In the drawings, the same elements are denoted by the same reference numerals, and redundant explanations are omitted as necessary.

First Example Embodiment

First, a first example embodiment of the present disclosure will be described. FIG. 1 is a block diagram illustrating a configuration of an image processing system 1 according to the first example embodiment. The image processing system 1 illustrated in FIG. 1 analyzes posture and a motion of a person included in an image photographed by a camera, for example, and detects that the posture or motion of the person falls under preset posture and a preset motion. The image processing system 1 includes a first terminal 10 and a second terminal 20. The first terminal 10 and the second terminal 20 are communicably connected to each other.

The first terminal 10 includes an image data acquisition unit 11 that acquires image data related to an image of a space from a camera that captures a predetermined space. The first terminal 10 transmits the image data acquired by the image data acquisition unit 11 to the second terminal 20.

The second terminal 20 is communicably connected to the first terminal 10, and receives image data from the first terminal 10. The second terminal 20 includes an analysis unit 21, a detection unit 22, and an output unit 23. The second terminal 20 is communicably connected to a management terminal to be used by a user who uses the image processing system 1.

The analysis unit 21 analyzes whether skeletal data relating to a structure of a body of a person included in the image are similar to predetermined reference skeletal data. Herein, the skeletal data are data indicating a structure of a body of a person for detecting posture or a motion of the person, and is constituted by a combination of a plurality of pseudo joint points and a pseudo skeleton structure. The image data for extracting the skeletal data may be image data including an image of one frame, or may include images of a plurality of consecutive frames photographed as a moving image at a plurality of different times. In the following explanation, an image of one frame may be referred to as a frame image or simply a frame.

In the image processing system 1, for example, the analysis unit 21 may extract that a person is included in an image related to the image data, and set skeletal data that are an image of a pseudo skeleton with respect to the extracted image of the person. The image processing system 1 may receive the skeletal data of the person included in the image of the image data acquired by the first terminal 10 from the outside.

The predetermined reference skeletal data for contrasting with the skeletal data set for the image of the person are image data for reference set in advance. The reference skeletal data include skeletal data configured to be comparable to the skeletal data described above.

The detection unit 22 receives a signal as a result of the analysis by the analysis unit 21, and detects a predetermined event from the received signal. The result of the analysis includes information indicating whether the skeletal data related to the image of the person match the predetermined reference skeletal data. Alternatively, in a case where there is a plurality of pieces of reference skeletal data, the result of the analysis may include information regarding which reference skeletal data the skeletal data related to the image of the person match when the skeletal data match the predetermined reference skeletal data.

The predetermined event is an event caused by posture or a motion of a person. Namely, the predetermined event may be one that indicates, for example, the posture or motion of the person itself. In this case, the predetermined event may be, for example, standing, walking, running, sitting down, or the like. The predetermined event may be one that indicates an abstract concept associated with the posture or motion of the person. In this case, the predetermined event may be, for example, gathering, escaping, fighting, or the like.

The output unit 23 outputs result information that is a result of the detection. A destination to be output by the output unit 23 is, for example, the management terminal described above. The second terminal 20 may have a display apparatus, which is not illustrated, in the second terminal 20 itself, and may output predetermined information to the user.

Figure 2:
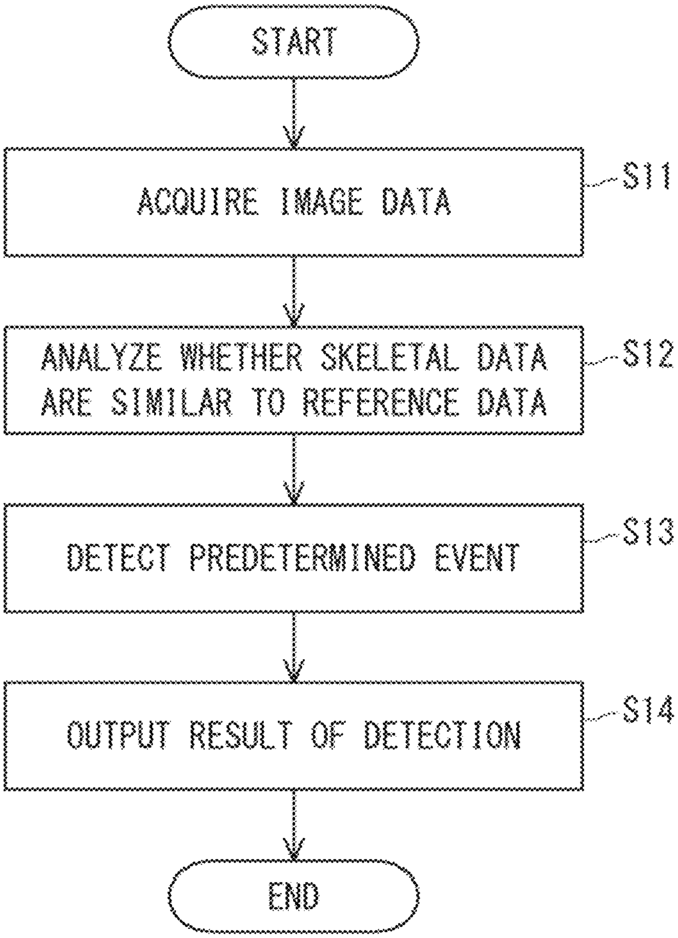
FIG. 2 is a flowchart illustrating a flow of an image processing method according to the first example embodiment.

Next, processing of the image processing system 1 will be described with reference to FIG. 2. FIG. 2 is a flowchart illustrating a flow of an image processing method according to the first example embodiment. The flowchart illustrated in FIG. 2 is started by, for example, the image processing system 1 acquiring image data.

First, the first terminal 10 acquires image data related to an image of a space from a camera that photographs a predetermined space (step S11).

Next, the second terminal 20 analyzes whether the skeletal data relating to a structure of a body of a person included in the image are similar to the predetermined reference skeletal data (step S12).

Next, the second terminal 20 detects a predetermined event based on a result of the analysis (step S13), and outputs result information that is a result of the detection (step S14).

Although the first example embodiment has been described above, the configuration of the image processing system 1 is not limited to the configuration described above. In the image processing system 1, it is sufficient that at least one of the first terminal 10 or the second terminal 20 includes the analysis unit 21. Namely, in the image processing system 1, the first terminal 10 may include the analysis unit 21 instead of the second terminal 20.

The image processing system 1 may include a plurality of first terminals 10. The first terminal 10 may acquire a plurality of pieces of image data from a plurality of cameras. In this case, the image processing system 1 acquires a plurality of pieces of image data by each of the plurality of first terminals 10, and supplies the acquired pieces of image data to the second terminal 20. The second terminal 20 receives the image data of the images photographed by each of the cameras via the first terminal 10, and detects an event regarding the posture or motion of the person included in each of the images. In the image processing system 1, a configuration in which the first terminal 10 acquires image data from a plurality of cameras and the second terminal 20 further acquires and analyzes these images can be adopted in a predetermined space in which a large number of people come and go, such as a city and a residential quarter.

The first terminal 10 and the second terminal 20 have a processor and a storage apparatus as a configuration not to be illustrated. The storage apparatus included in the image processing system 1 includes a storage apparatus including a non-volatile memory such as a flash memory or a solid state drive (SSD). In this case, the storage apparatus included in the image processing system 1 stores a computer program (hereinafter, also simply referred to as a program) for executing the image processing method described above. The processor reads the computer program from the storage apparatus into a buffer memory such as a dynamic random access memory (DRAM) and executes the program.

Each of the configurations of the first terminal 10 and the second terminal 20 in the image processing system 1 may be achieved by dedicated hardware. In addition, some or all of the components may be achieved by a general-purpose or dedicated circuitry, a processor, or the like, or by a combination thereof. These may be constituted by a single chip, or may be constituted by a plurality of chips connected via a bus. Some or all of the components of each apparatus may be achieved by a combination of the above-described circuitry or the like and a program. Further, as the processor, a central processing unit (CPU), a graphics processing unit (GPU), a field-programmable gate array (FPGA), or the like can be used. Note that the explanation of the configuration described here may be applied to other apparatuses or systems to be described below in the present disclosure.

When some or all of the constituent elements of the image processing system 1 are achieved by a plurality of information processing apparatuses, circuitries, and the like, the plurality of information processing apparatuses, circuitries, and the like may be centrally arranged or dispersedly arranged. For example, the information processing apparatus, the circuitry, and the like may be achieved as a form in which each of the client server system, the cloud computing system, and the like is connected via a communication network. In addition, the functions of the image processing system 1 may be provided in a software as a service (SaaS) format.

According to the present example embodiment, it is possible to provide an image processing system and the like capable of efficiently processing an image photographed by a camera.

Second Example Embodiment

Figure 3:
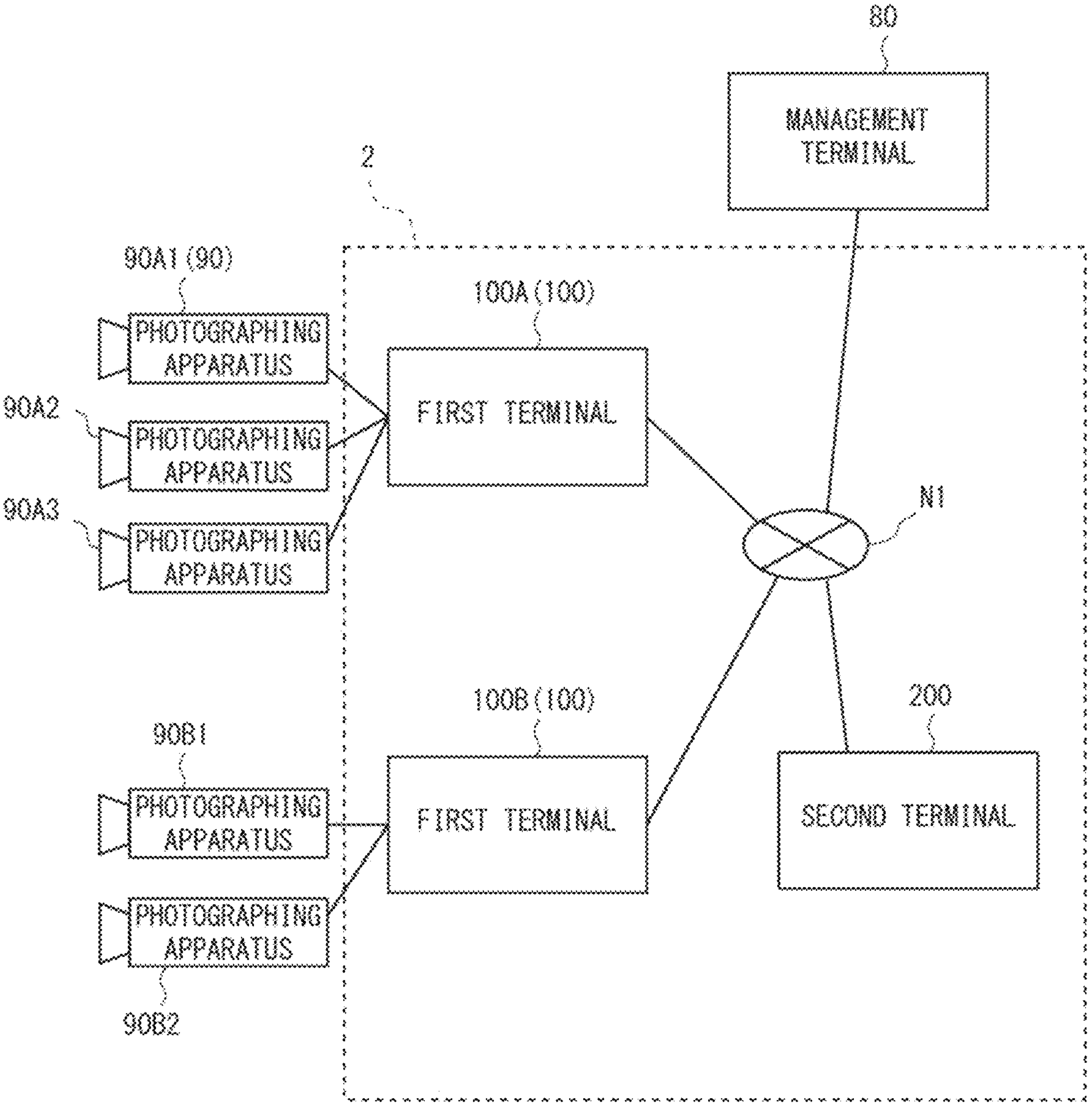
FIG. 3 is a diagram illustrating an overall configuration of an image processing system according to a second example embodiment.

Next, a second example embodiment of the present disclosure will be described. FIG. 3 is a diagram illustrating an overall configuration of an image processing system 2 according to the second example embodiment. The image processing system 2 includes a plurality of first terminals 100 (100A and 100B) and a second terminal 200. The first terminal 100A, the first terminal 100B, and the second terminal 200 are communicably connected to each other via a network N1. The first terminal 100A is communicably connected to three photographing apparatuses 90 (a photographing apparatus 90A1, a photographing apparatus 90A2, and a photographing apparatus 90A3). The first terminal 100B is communicably connected to two photographing apparatuses 90 (a photographing apparatus 90B1 and a photographing apparatus 90B2).

The image processing system 1 is also communicably connected to a management terminal 80 via the network N1. The management terminal 80 is, for example, a smartphone, a tablet terminal, a personal computer, or the like, and manages the first terminals 100 or the second terminal 200. In addition, the management terminal 80 may receive predetermined information from a user and supply the received information to the first terminals 100 or the second terminal 200. The management terminal 80 may receive predetermined information to be output from the first terminals 100 or the second terminal 200 and notify the user of the predetermined information.

Figure 4:
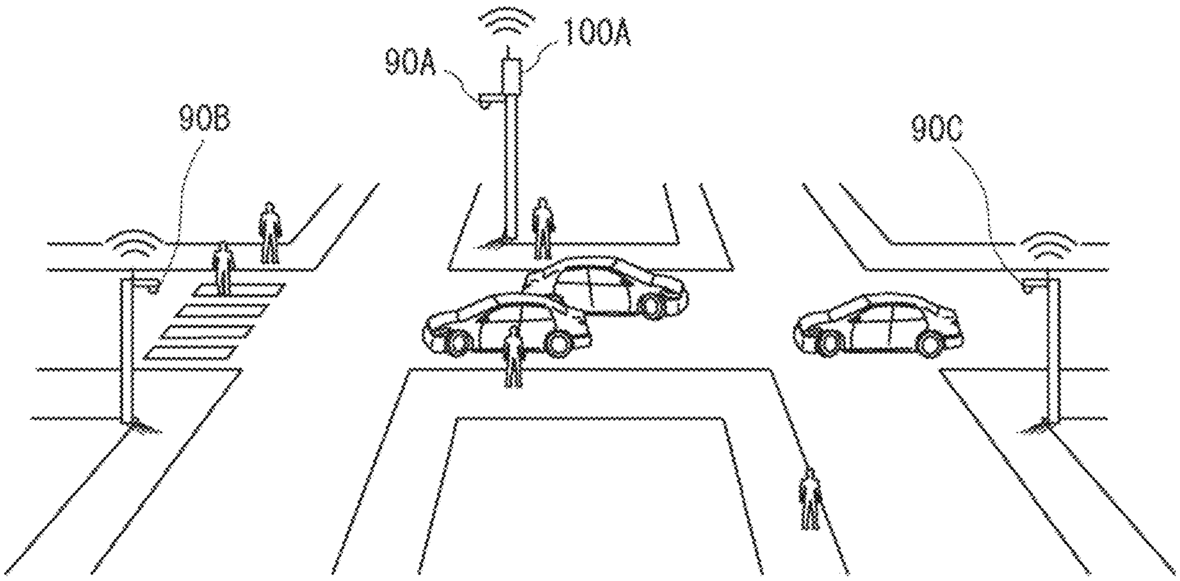
FIG. 4 is a diagram illustrating an example of use of the image processing system according to the second example embodiment.

FIG. 4 is a diagram illustrating an example of use of the image processing system according to the second example embodiment. FIG. 4 illustrates any urban area including roadways and sidewalks. In the urban area illustrated in FIG. 4, a photographing apparatus 90A, a photographing apparatus 90B, a photographing apparatus 90C, and a first terminal 100A are installed. The photographing apparatus 90A, the photographing apparatus 90B, and the photographing apparatus 90C are installed in the upper portion of a predetermined iron column, and photograph a street from a position higher than the height of a person by looking at the street. The photographing apparatus 90A, the photographing apparatus 90B, and the photographing apparatus 90C each transmit image data of the photographed image to the first terminal 100A by wireless communication.

The first terminal 100A is installed in the upper portion of the same iron column as the photographing apparatus 90A, and receives image data to be supplied from each of the photographing apparatus 90A, the photographing apparatus 90B, and the photographing apparatus 90C. The first terminal 100A performs predetermined processing on the received image data, and transmits the processed data to the second terminal 200. The second terminal 200 is installed at an arbitrary location apart from the first terminal 100, and receives data transmitted from the first terminal 100A. With such a configuration, the image processing system 2 can monitor the action of a person in a predetermined space.

Figure 5:
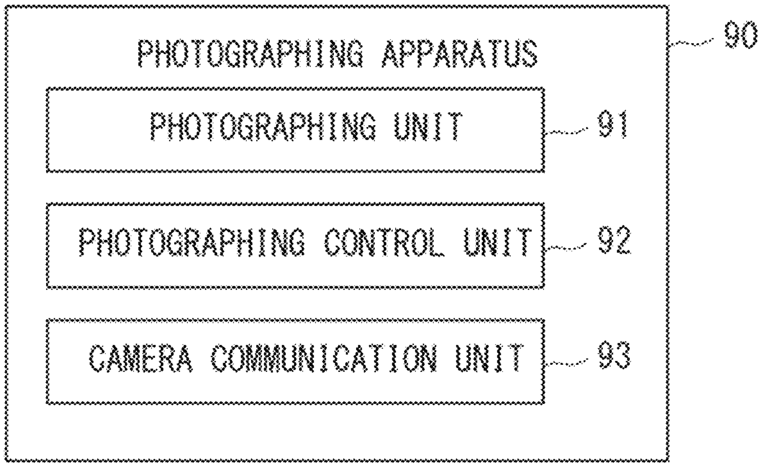
FIG. 5 is a block diagram illustrating a configuration of a photographing apparatus according to the second example embodiment.

Next, an example of a configuration of the photographing apparatus 90 will be described with reference to FIG. 5. FIG. 5 is a block diagram illustrating a configuration of a photographing apparatus 90 according to the second example embodiment. The photographing apparatus 90 mainly includes a photographing unit 91, a photographing control unit 92, and a camera communication unit 93. The photographing apparatus 90 may be referred to as a camera. The photographing apparatus 90 photographs the image every predetermined period, generates image data for each of the photographed images, and sequentially supplies the generated image data to the first terminal 100. The predetermined period is, for example, 1/15 seconds, 1/30 seconds, 1/60 seconds, or the like.

The photographing unit 91 includes an objective lens and an image sensor, and photographs a landscape of an urban area. The photographing unit 91 may have functions such as panning, tilting, and zooming. The photographing control unit 92 controls the motion of the photographing unit 91. Further, the photographing control unit 92 generates image data related to the image photographed by the photographing unit 91. The image data may include shooting conditions such as shooting date and time, positional information, or an aperture at a time of shooting, and shutter speed. Further, the photographing control unit 92 performs control of transmitting image data via the camera communication unit 93. The camera communication unit 93 includes an interface for communicating with the first terminal 100. The camera communication unit 93 transmits the image data generated by the photographing control unit 92 to the first terminal 100.

Figure 6:
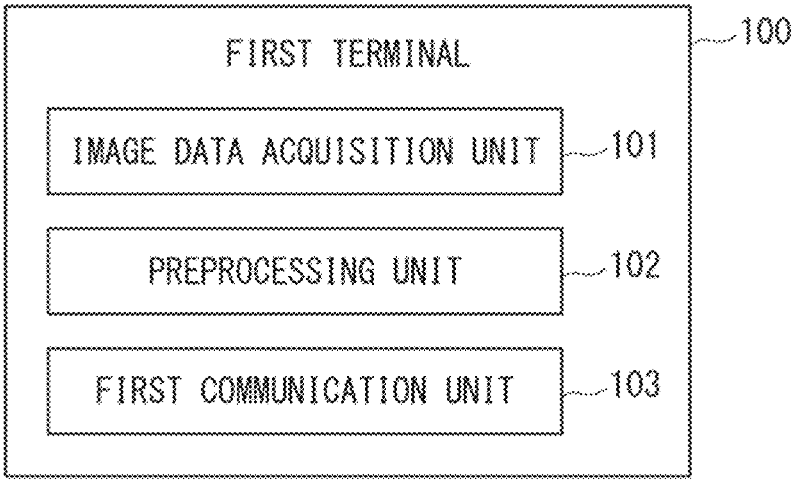
FIG. 6 is a block diagram illustrating a configuration of a first terminal according to the second example embodiment.

Next, the first terminal 100 will be described with reference to FIG. 6. FIG. 6 is a block diagram illustrating a configuration of the first terminal 100 according to the second example embodiment. The first terminal 100 mainly includes an image data acquisition unit 101, a preprocessing unit 102, and a first communication unit 103.

The image data acquisition unit 101 sequentially acquires image data supplied from the photographing apparatus 90 via the first communication unit 103.

The preprocessing unit 102 performs predetermined preprocessing on the image data supplied from the photographing apparatus 90 and generates preprocessed data. The predetermined preprocessing may be, for example, adjustment of contrast, tone, or the like of the image, or enlargement or reduction of the image to a predetermined size. The predetermined preprocessing may be processing for cutting out an image. The predetermined preprocessing may be processing of generating extracted image data acquired by extracting an image including a person.

The predetermined preprocessing may be setting of a resolution of the image. In this case, for example, the preprocessing unit 102 sets the resolution of the image when the number of persons included in the image is less than a threshold value as a first resolution, and sets the resolution of the image when the number of persons included in the image is equal to or more than the threshold value as a second resolution. In this case, for example, the preprocessing unit 102 performs preprocessing by setting the first resolution lower than the second resolution. The first terminal 100 supplies the preprocessed data processed by the preprocessing unit 102 in this manner to the second terminal 200.

The first communication unit 103 is an interface that communicates with the photographing apparatus 90. The first communication unit 103 is also an interface that communicates with the second terminal 200. The first terminal 100 receives image data from the photographing apparatus 90 via the first communication unit 103. The first terminal 100 transmits the preprocessed data generated by the preprocessing unit 102 to the second terminal 200 via the first communication unit 103.

Figure 7:
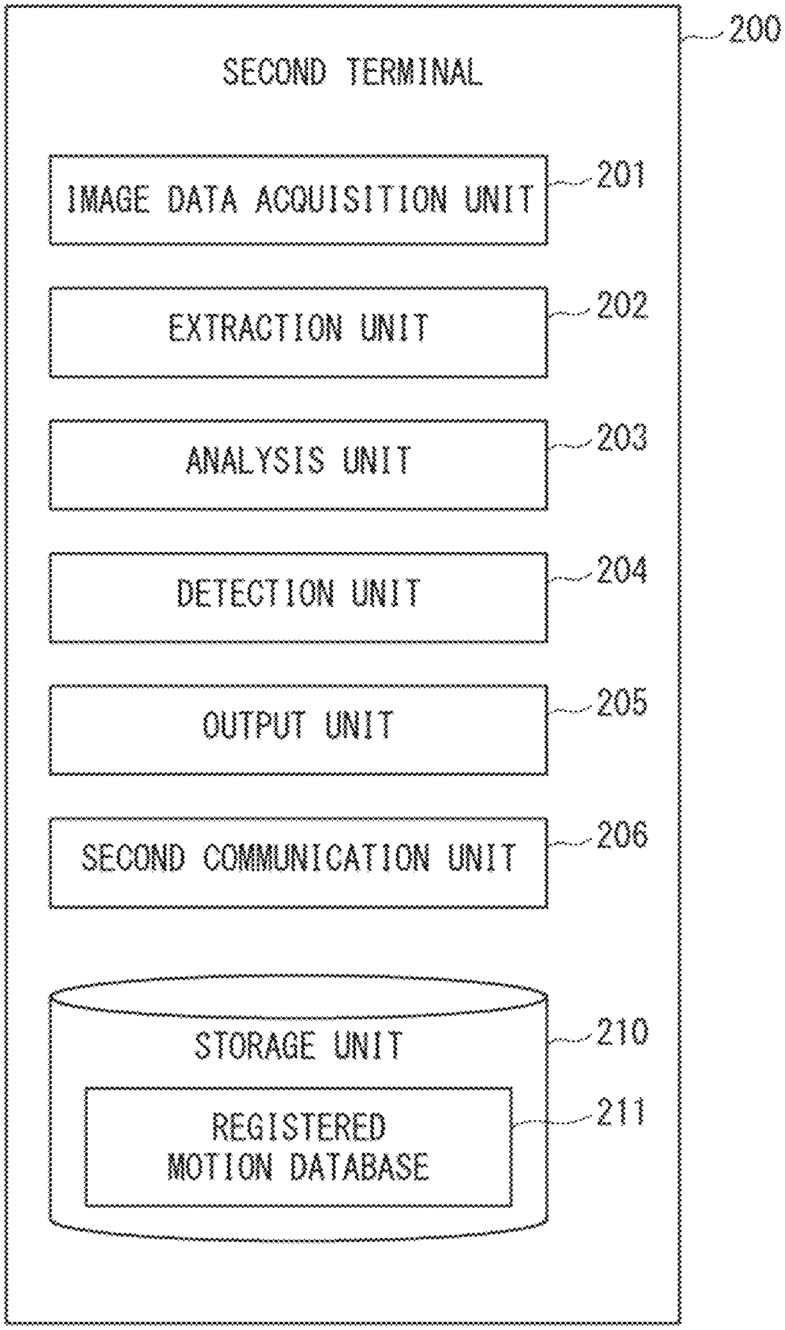
FIG. 7 is a block diagram illustrating a configuration of a second terminal according to the second example embodiment.

FIG. 7 is a block diagram illustrating a configuration of the second terminal 200 according to the second example embodiment. The second terminal 200 mainly includes an image data acquisition unit 201, an extraction unit 202, an analysis unit 203, a detection unit 204, an output unit 205, a second communication unit 206, and a storage unit 210.

The image data acquisition unit 201 acquires the image data received from the first terminal 100 via the second communication unit 206. The second terminal 200 supplies the received image data to the extraction unit 202.

The extraction unit 202 extracts skeletal data from the image data. More specifically, the extraction unit 202 detects an image region (body region) of a body of a person from a frame image included in the image data, and extracts (for example, cuts out) the image as a body image. Then, the extraction unit 202 extracts skeletal data of at least a part of the body of the person based on the characteristics of a joint or the like of the person recognized in the body image by using a skeleton estimation technique using machine learning. The skeletal data are information including "key points" which are characteristic points such as joints, and a "bone link" which indicates a link between the key points. The extraction unit 202 may use, for example, a skeleton estimation technique such as OpenPose. In the present disclosure, the bone link described above may be simply referred to as "bone". The bone means a pseudo-skeleton.

The analysis unit 203 detects predetermined posture or motion associated with the posture of the person from the skeletal data of the extracted person. When detecting the posture or motion, the analysis unit 203 searches for a registered motion registered in a registered motion database 211 stored in the storage unit 210. When the skeletal data of the person and the skeletal data related to the registered motion are similar to each other, the analysis unit 203 recognizes the skeletal data as predetermined posture or motion. Thus, when the registered motion similar to the skeletal data of the person is detected, the analysis unit 203 recognizes the motion related to the skeletal data as predetermined posture or motion in association with the registered motion.

In the similarity determination described above, the analysis unit 203 detects the posture or motion by calculating a degree of similarity in form of elements constituting the skeletal data. The skeletal data include a pseudo joint point or a skeleton structure for indicating the posture of the body set as a constituent element thereof. The form of the elements constituting the skeletal data may be, for example, a relative geometric relationship such as positions, distances, and angles of other key points or bones with respect to a certain key point or bone. Alternatively, the form of the elements constituting the skeletal data may be, for example, a single unified form formed by a plurality of key points or bones.

The analysis unit 203 analyzes whether the relative forms of the constituent elements are similar between the two pieces of skeletal data to be compared. At this time, the analysis unit 203 calculates a degree of similarity between the two pieces of skeletal data. When calculating the degree of similarity, the analysis unit 203 can calculate the degree of similarity based on the feature amount calculated from the constituent elements included in the skeletal data, for example.

A calculation target of the analysis unit 203 may be, instead of the above-described degree of similarity, a degree of similarity between a part of the extracted skeletal data and the skeletal data related to the registered motion, a degree of similarity between the extracted skeletal data and a part of the skeletal data related to the registered motion, or a degree of similarity between a part of the extracted skeletal data and a part of the skeletal data related to the registered motion.

The analysis unit 203 may calculate the above-described degree of similarity by using skeletal data directly or indirectly. For example, the analysis unit 203 may convert at least a part of the skeletal data into another format, and calculate the degree of similarity described above by using the converted data. In this case, the degree of similarity may be a degree of similarity between the converted data itself or may be a value calculated by using the degree of similarity between the converted data.

The conversion method may be normalization of an image size related to skeletal data or conversion into a feature amount using an angle formed by a skeleton structure (i.e., a degree of bending of a joint). Alternatively, the conversion method may be three-dimensional posture that is converted by a learned model of machine learning that has been learned in advance.

The analysis unit 203 may detect the posture or motion from the skeletal data extracted from one piece of image data. Further, the analysis unit 203 may analyze a working motion of the person in time series from the skeletal data extracted from each of the plurality of pieces of image data photographed at a plurality of different times. With such a configuration, the image processing system 2 can flexibly analyze the motion in response to the state of a change in the posture or the motion to be detected.

The detection unit 204 receives a signal as a result of the analysis by the analysis unit 203, and detects a predetermined event from the received signal. Namely, the detection unit 204 in the present example embodiment has the same function as that of the detection unit 22 in the first example embodiment.

The output unit 205 outputs result information that is a result of the detection. A destination to be output by the output unit 205 is the management terminal 80. Note that the second terminal 200 may have a display apparatus, which is not to be illustrated, in the second terminal 200 itself, and output predetermined information to the user.

The second communication unit 206 is means for communicating with the first terminal 100 and the management terminal 80, and includes, for example, an interface for connecting to the network N1.

The storage unit 210 is storage means including a non-volatile memory. The storage unit 210 stores at least the registered motion database 211. The registered motion database 211 includes skeletal data as a registered motion.

Although the configuration of the image processing system 2 has been described above, the image processing system 2 according to the second example embodiment is not limited to the configuration described above. For example, a part or all of the extraction unit 202 included in the image processing system 2 may be included in the photographing apparatus 90. In this case, for example, the photographing apparatus 90 may extract a body image related to a person by processing the photographed image. Alternatively, the photographing apparatus 90 may further extract skeletal data of at least a part of the body of the person from the body image based on a characteristic such as a joint of the person recognized in the body image. When the photographing apparatus 90 has such a function, the photographing apparatus 90 supplies at least skeletal data to the image processing system 2. In addition to the skeletal data, the photographing apparatus 90 supplies the image data to the photographing apparatus 90. In addition to the configuration example described above, the image processing system 2 may include the photographing apparatus 90.

Figure 8:
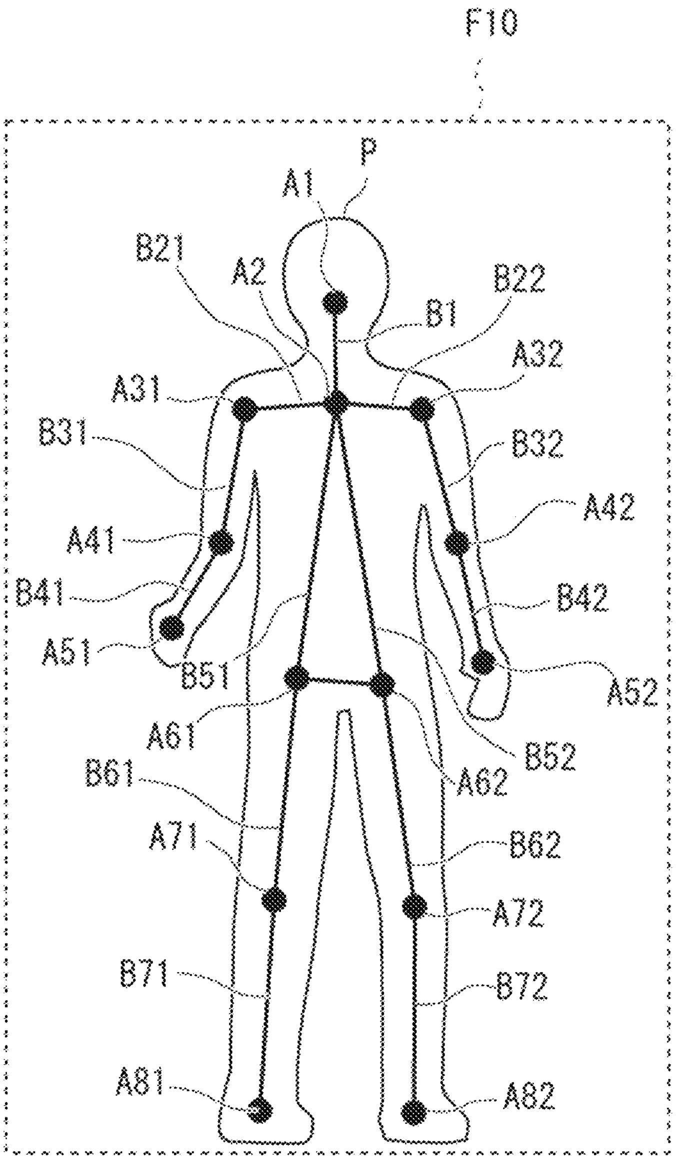
FIG. 8 is a diagram illustrating skeletal data extracted from image data.

Next, an example of detecting posture of a person will be described with reference to FIG. 8. FIG. 8 is a diagram illustrating skeletal data extracted from image data. The image illustrated in FIG. 8 is a body image F10 acquired by extracting the body of a person P from the image photographed by the photographing apparatus 90. In the image processing system 10, the extraction unit 202 cuts out a body image F10 from the image photographed by the photographing apparatus 90, and further sets a skeleton structure.

The extraction unit 202 extracts, for example, a feature point that can be a key point of the person P from among the image. Further, the extraction unit 202 detects a key point from the extracted feature point. When detecting a key point, the extraction unit 202 refers to, for example, machine-learned information regarding an image of the key point.

In the example illustrated in FIG. 8, the extraction unit 202 detects a head A1, a neck A2, a right shoulder A31, a left shoulder A32, a right elbow A41, a left elbow A42, a right hand A51, a left hand A52, a right waist A61, a left waist A62, a right knee A71, a left knee A72, a right foot A81, and a left foot A82 as key points of the person P.

Further, the extraction unit 202 sets a bone connecting these key points as a pseudo skeleton structure of a worker P as illustrated below. A bone B1 connects the head A1 and the neck A2. A bone B21 connects the neck A2 and the right shoulder A31, and a bone B22 connects the neck A2 and the left shoulder A32. A bone B31 connects the right shoulder A31 and the right elbow A41, and a bone B32 connects the left shoulder A32 and the left elbow A42. A bone B41 connects the right elbow A41 and the right hand A51, and a bone B42 connects the left elbow A42 and the left hand A52. A bone B51 connects the neck A2 and the right waist A61, and a bone B52 connects the neck A2 and left waist A62. A bone B61 connects the right waist A61 and the right knee A71, and a bone B62 connects the left waist A62 and the left knee A72. A bone B71 connects the right knee A71 and the right foot A81, and a bone B72 connects the left knee A72 and the left foot A82. Upon generating the skeletal data relating to the skeleton structure described above, the extraction unit 202 supplies the generated skeletal data to the analysis unit 103.

Next, an example of the registered motion database will be described with reference to FIG. 9. FIG. 9 is a diagram for explaining the registered motion database according to the second example embodiment. In a table illustrated in FIG. 9, registered motion identification (identifier: ID) and a plurality of related words are associated with each other. The related words relating to a motion whose registered motion ID (or motion ID) is “R01” are “running”, “hurrying”, and the like. The related words whose registered motion ID is “R02” are “walking”, “slow”, and the like, the related words whose registered motion ID is “R03” are “sitting down”, “squatting down”, and the like, and the related words whose registered motion ID is “R04” are “sitting down”, “crouching down” and the like.

As described above, the data relating to the registered motion included in the registered motion database 211 are stored in association with the motion ID and the related words for each motion. Each registered motion ID is associated with one or more skeletal data. That is, for example, the registered motion with the motion ID “R01” includes skeletal data indicating a running motion or a hurrying motion.

Figure 10:
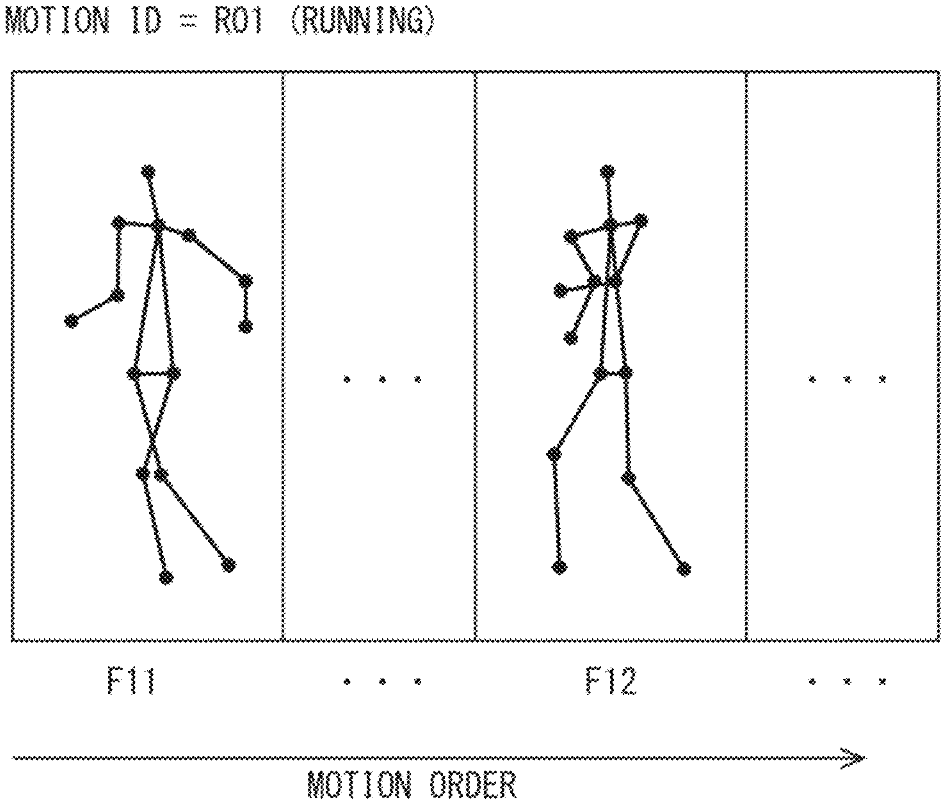
FIG. 10 is a diagram for explaining a first example of a registered motion according to the second example embodiment.

With reference to FIG. 10, skeletal data related to the registered motion will be described. FIG. 10 is a diagram for explaining a first example of the registered motion according to the second example embodiment. FIG. 10 illustrates skeletal data relating to the motion with the motion ID "R01" among the registered motions included in the registered motion database 211. FIG. 10 illustrates a state in which a plurality of pieces of skeletal data including skeletal data F11 and skeletal data F12 are arranged in a left-right direction. The skeletal data F11 are located on a left side from the skeletal data F12. The skeletal data F11 are posture obtained by capturing a scene of a running person. The skeletal data F12 are one scene of a running person, and posture thereof is different posture from the skeletal data F11.

This means that the registered motion with the motion ID "R01" takes the posture of the skeletal data F12 after the person takes the posture corresponding to the skeletal data F11. Although two pieces of skeletal data have been described here, the registered motion with the motion ID "R01" may include skeletal data other than the skeletal data described above.

Figure 11:
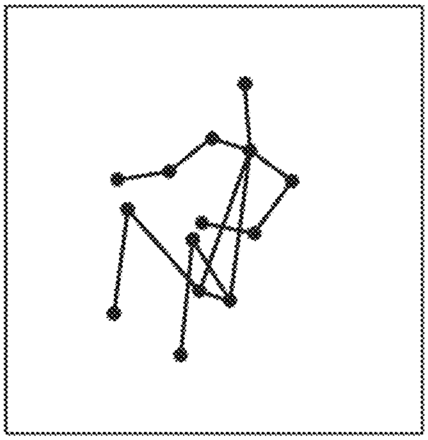
FIG. 11 is a diagram for explaining a second example of the registered motion according to the second example embodiment.

FIG. 11 is a diagram for explaining a second example of the registered motion according to the second example embodiment. FIG. 11 illustrates skeletal data F31 relating to the motion with the motion ID "R03" illustrated in FIG. 9. In the registered motion with the motion ID "R03", only one piece of skeletal data F31 indicating a person sitting down is registered.

As described above, the registered motion included in the registered motion database 211 may include only one piece of skeletal data, or may include two or more pieces of skeletal data. The analysis unit 203 of the second terminal 200 compares the registered motion including the skeletal data described above with the skeletal data received from the extraction unit 202, and determines whether there is a similar registered motion.

Although the second example embodiment has been described above, the image processing system 2 according to the second example embodiment is not limited to the configuration described above. The first terminal 100 may be communicably connected to one or more photographing apparatuses 90. The first terminal 100 and the photographing apparatus 90 may be connected to each other via the network N1. The image processing system 2 may include one or more first terminals 100. The image processing system 2 may include one or more photographing apparatuses 90. The image processing system 2 may include one or more management terminals 80.

In the image processing system 2, a configuration in which the first terminal 100 acquires image data from a plurality of cameras and the second terminal 200 further acquires and analyzes these images is adopted in a predetermined space in which a large number of people come and go, such as a city and a residential quarter. In such a case, it is desirable that a communication between the plurality of photographing apparatuses 90 and the first terminal 100 and a communication between the first terminal 100 and the second terminal 200 have a wide bandwidth. For example, in order to achieve these communications, the image processing system 2 may employ a fifth generation mobile communication system (5G) line having a transfer rate of about gigabits per second. By using such a high-speed communication line, the 10 image processing system 2 can transmit and receive image data having a high frame rate and a high resolution and analyze the transmitted and received image data.

As described above, according to the second example embodiment, it is possible to provide an image processing system and the like capable of efficiently processing images photographed by a plurality of cameras. In addition, even in a case where a large number of cameras are installed over a wide area, this image processing system and the like can efficiently process images acquired by capturing images of various locations in the wide area.

Third Example Embodiment

Figure 12:
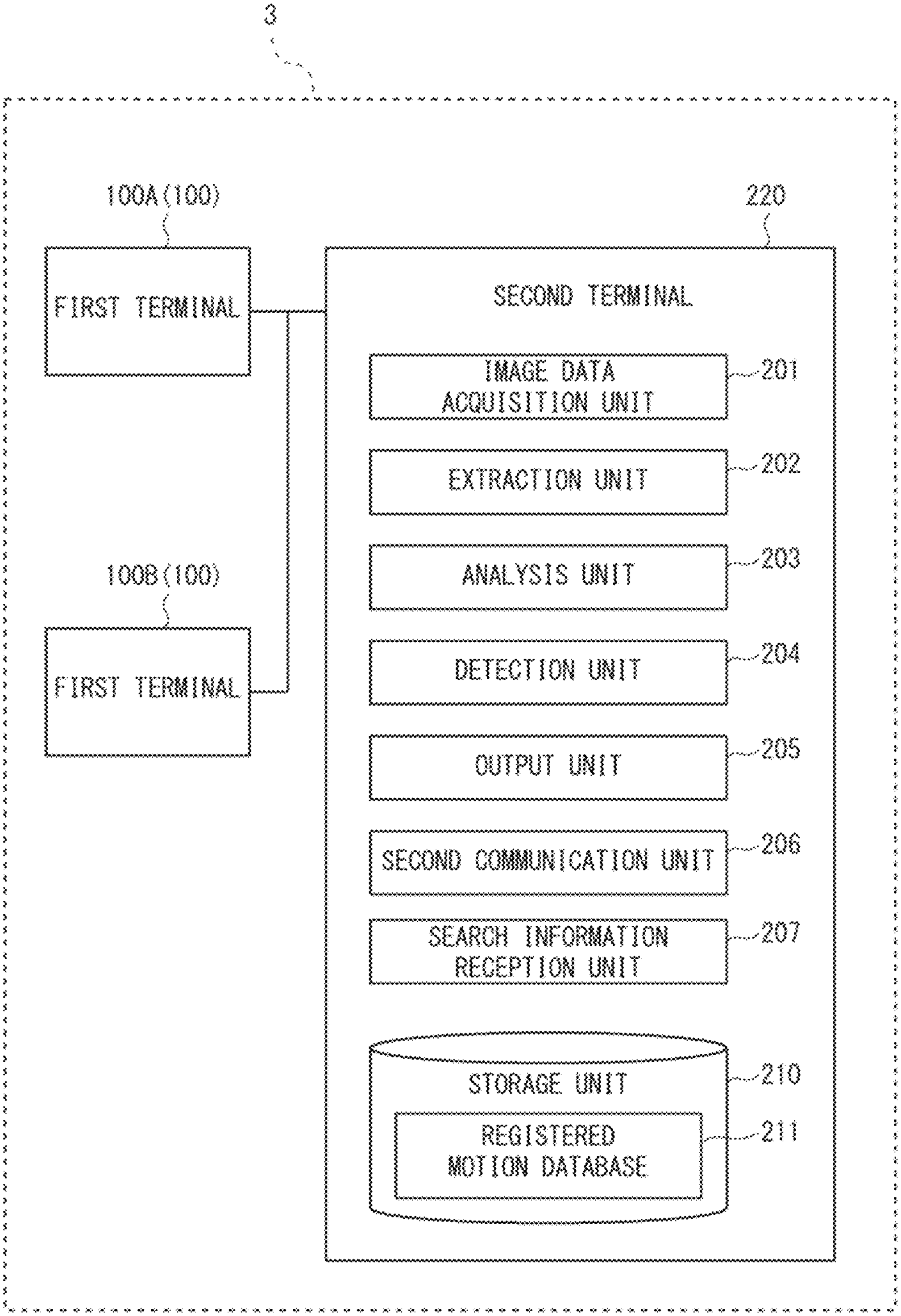
FIG. 12 is a block diagram illustrating a configuration of a second terminal according to a third example embodiment.

Next, a third example embodiment will be described. The third example embodiment is different from the second example embodiment in that it further includes a search information reception unit 207. FIG. 12 is a block diagram of an image processing system 3 according to the third example embodiment. In the image processing system 3 illustrated in FIG. 12, the photographing apparatus 90, the management terminal 80, and the network N1 are omitted. A first terminal 100 illustrated in FIG. 12 has the same configuration as that of the second example embodiment, and details thereof are omitted. The image processing system 3 includes a second terminal 220. The second terminal 220 is different from the second terminal 200 described in the second example embodiment in that the second terminal 220 includes the search information reception unit 207.

The search information reception unit 207 receives predetermined search information regarding posture or an action of a person. The search information is, for example, information to be supplied by the management terminal 80 to the second terminal 220. When the search information reception unit 207 receives the search information, the analysis unit 203 sets reference skeletal data corresponding to the posture related to the search information, and analyzes whether the reference skeletal data are similar to the skeletal data related to the image. Furthermore, the detection unit 204 detects an event corresponding to the search information based on a result of the analysis. Then, an output unit 205 supplies a result of the detection corresponding to the search information received from the management terminal 80 to the management terminal 80.

Figure 13:
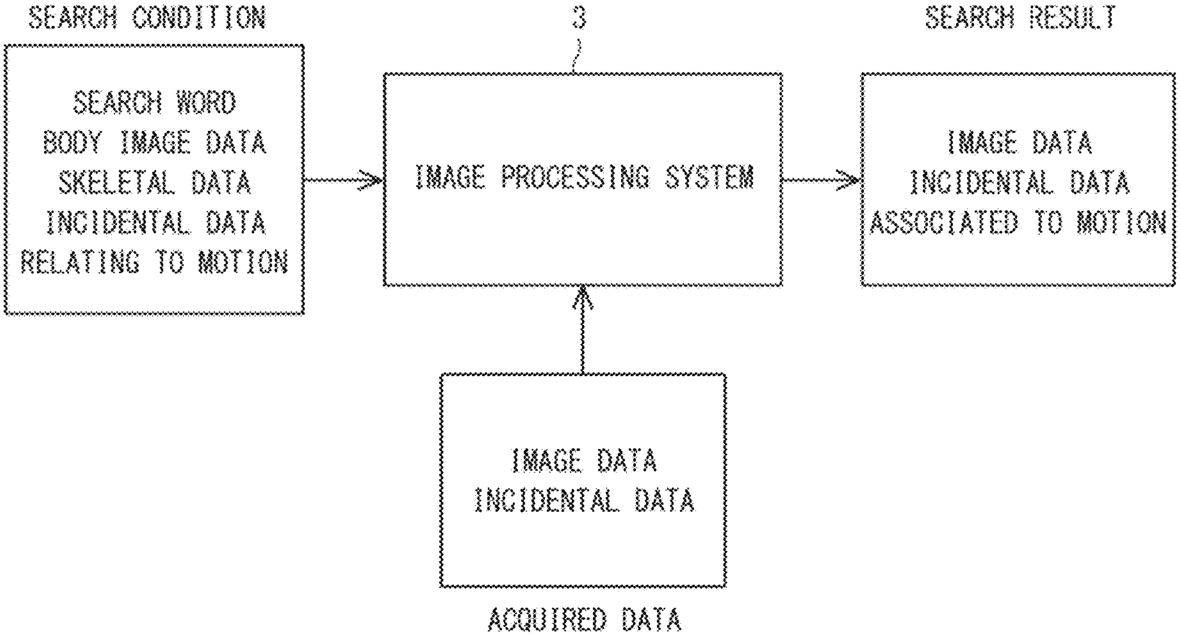
FIG. 13 is a diagram illustrating search processing in an image processing system according to the third example embodiment.

FIG. 13 is a diagram illustrating search processing in the image processing system 3 according to the third example embodiment. FIG. 13 illustrates information input to the image processing system 3 and data to be output by the image processing system 3 in accordance with the input data.

The image processing system 3 receives, as a search condition, search data indicating posture or a motion of a person and incidental data attached thereto. Herein, the search data include any of a search word, body image data, and skeletal data indicating posture or a motion related to the search.

In this case, the search word is, for example, a phrase included in related words of the registered motion database 211 illustrated in FIG. 9. Alternatively, the search word may be a phrase that can be associated with the related word in the registered motion database 211. Further, the body image as the search condition is desirably a mode in which skeletal data that can be compared with the registered motion included in the registered motion database 211 can be extracted. The skeletal data as a search condition are also desirably a mode in which skeletal data that can be compared with the registered motion included in the registered motion database 211. Incidental data as a search condition include a photographing area to be searched, a photographing date and time, and the like. These search conditions are supplied from the management terminal 80 to the image processing system 3.

The image processing system 3 also acquires image data photographed by the photographing apparatus 90 as acquired data. Note that the image data include incidental data related to photographing. The incidental data may include, for example, a photographing location of an image related to the image data, an ID of the photographing apparatus 90 that has taken the image, a photographing date and time, and the like.

In the image processing system 3, the search information reception unit 207 receives the search information. The image processing system 3 performs processing according to the received search information. Specifically, for example, the detection unit 204 can detect an image of a person corresponding to the posture indicated by the search information as a predetermined event. Then, the image processing system 3 outputs the image data and the incidental data attached to the image data as the search result corresponding to the search condition. The image processing system 3 supplies the search result to the management terminal 80.

With the configuration described above, the image processing system 3 receives, for example, a search word "running" from the management terminal 80, and responds to the management terminal 80 with image data including an image of a motion in which a person is running from the acquired image data. Alternatively, the image processing system 3 responds to the management terminal 80 with data relating to a location and a date and time at which the image falling under "running" has been photographed, as information attached to the detected motion.

The third example embodiment has been described above. According to the third example embodiment, it is possible to efficiently perform a search according to a desired search condition to be set by the user. Namely, according to the third example embodiment, it is possible to provide an image processing system and the like capable of efficiently processing an image photographed by a camera.

Fourth Example Embodiment

Figure 14:
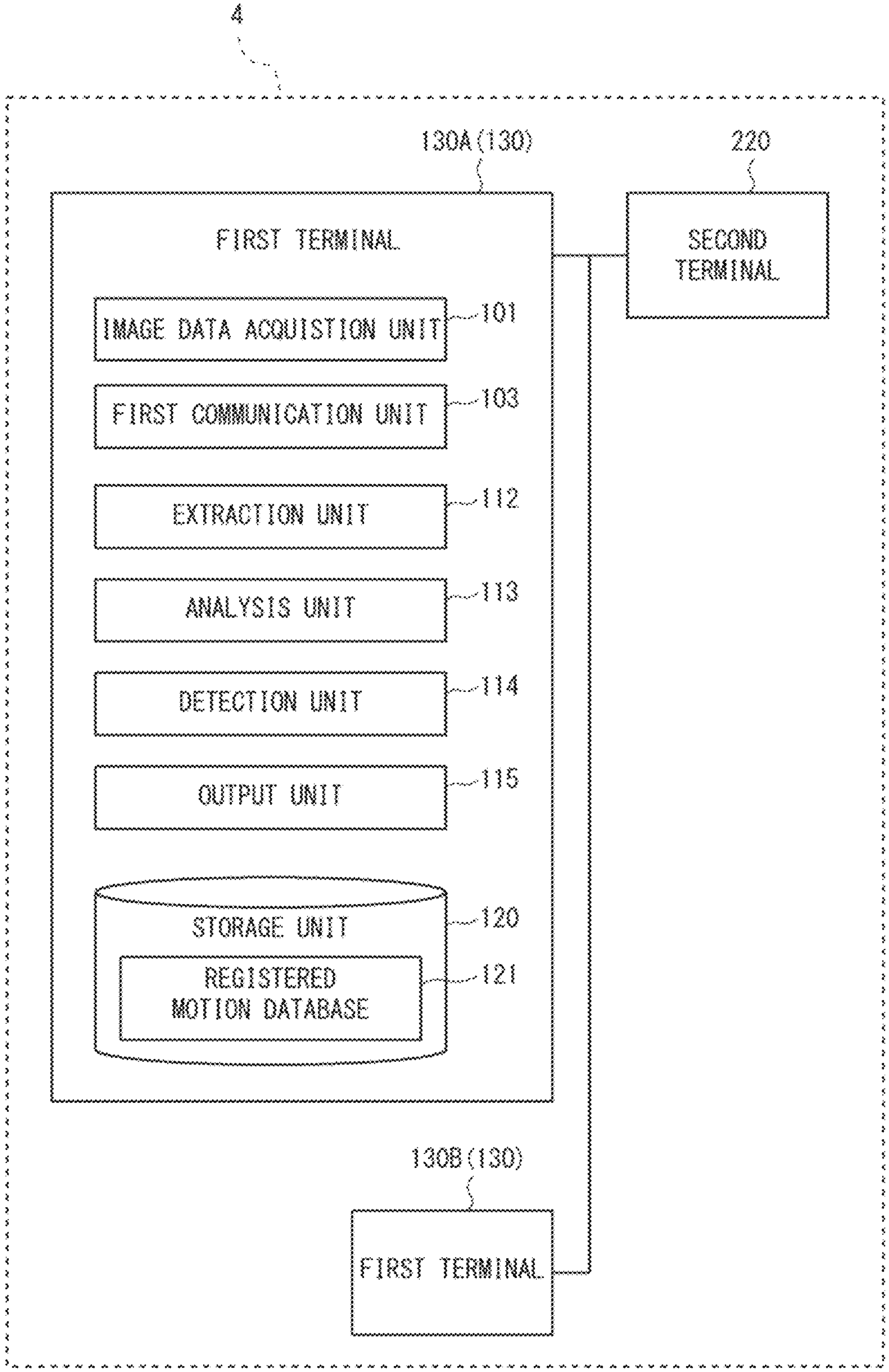
FIG. 14 is a block diagram illustrating a configuration of a first terminal according to a fourth example embodiment.

Next, a fourth example embodiment will be described. The fourth example embodiment is different from the image processing system 3 according to the third example embodiment in that the first terminal 100 is replaced with a first terminal 130. FIG. 14 is a block diagram of an image processing system 4 according to the fourth example embodiment. In the image processing system 4 illustrated in FIG. 14, a photographing apparatus 90, a management terminal 80, and a network N1 are omitted. The image processing system 4 illustrated in FIG. 14 illustrates only 130A of two first terminals 130 (130A and 130B) in detail, and a configuration of 130B is omitted, but it is assumed that the two first terminals 130 have the same configuration.

The first terminal 130 includes an extraction unit 112, an analysis unit 113, a detection unit 114, an output unit 115, and a storage unit 120. Note that the extraction unit 112, the analysis unit 113, the detection unit 114, the output unit 115, and the storage unit 120 included in the first terminal 130 have the same functions as the extraction unit 202, the analysis unit 203, the detection unit 204, the output unit 205, and the storage unit 210 included in the second terminal 200. Therefore, detailed description thereof will be omitted. Note that the output unit 115 included in the first terminal 130 outputs data relating to a detection result to the second terminal 200 or a second terminal 220.

With the configuration described above, in the image processing system 2 according to the present example embodiment, the first terminal 130 includes the analysis unit 113, which is first analysis means, and the second terminal 220 includes an analysis unit 203, which is second analysis means. In this case, the analysis unit 113 of the first terminal 130 analyzes whether a person image and first reference skeletal data are similar to each other, and generates first analysis result information. The detection unit 114, which is first detection means, detects an event from the first analysis result information. The analysis unit 203 of the second terminal 220 analyzes whether the person image and second reference skeletal data are similar to each other, and generates second analysis result information. A detection unit 204, which is second detection means, detects an event from the first analysis result information and the second analysis result information. As described above, the image processing system 4 has a function of extracting skeletal data from the first terminal 130 and the second terminal 220 and further detecting an event. As a result, the image processing system 4 can distribute a load between the first terminal 130 and the second terminal 220 and share a registered motion to be referred to.

In the image processing system 4, the analysis unit 113 included in the first terminal 130 may generate the first analysis result information, and the second terminal 220 may detect an event based on the plurality of pieces of first analysis result information acquired from the plurality of first terminals 130. As described above, the image processing system 4 can flexibly perform the function sharing between the first terminal 130 and the second terminal 220.

Next, a search function of the image processing system 4 according to the present example embodiment will be described. The search information reception unit 207 in the present example embodiment receives, as search information, a search word indicating a predetermined event caused by an action of a person. The predetermined event caused by the action of the person includes abstract concepts such as "snatch-and-grab", "fight", "meeting", "street performance", "panic", and "riot", which do not directly indicate the posture or motion of the person. Note that the predetermined event caused by the action of the person may also include a search word such as "walk" "run", which has a meaning directly indicating the posture or motion of the person.

FIG. 15 is a diagram for explaining a registered motion database according to the fourth example embodiment. In the registered motion database illustrated here, a plurality of motion IDs and words or phrases indicating events corresponding to the plurality of motion IDs are associated with each other. Specifically, for example, skeletal data with a motion ID "R01" and skeletal data with a motion ID "R11" are associated with the event of "snatch-and-grab". This indicates that a person who performs a plurality of different poses or motions (for example, "R01" indicating "running", "R11" indicating "falling", and the like) appears within a predetermined period of time or concurrently. Similarly, in the registered motion database illustrated in FIG. 15, skeletal data with motion IDs "R02", "R12", and "R22" are associated with the event of "fight", and skeletal data with motion IDs "R03" and "R13" are associated with the event of "meeting".

Note that the registered motion database illustrated in FIG. 15 may be included in the first terminal 130 or the second terminal 220. The first terminal 130 and the second terminal 220 may share each other and store a registered motion database, or a registered motion database included in one terminal may be used by another terminal.

Next, an example of using the registered motion database described above will be described with reference to FIG. 16.

Figure 16:
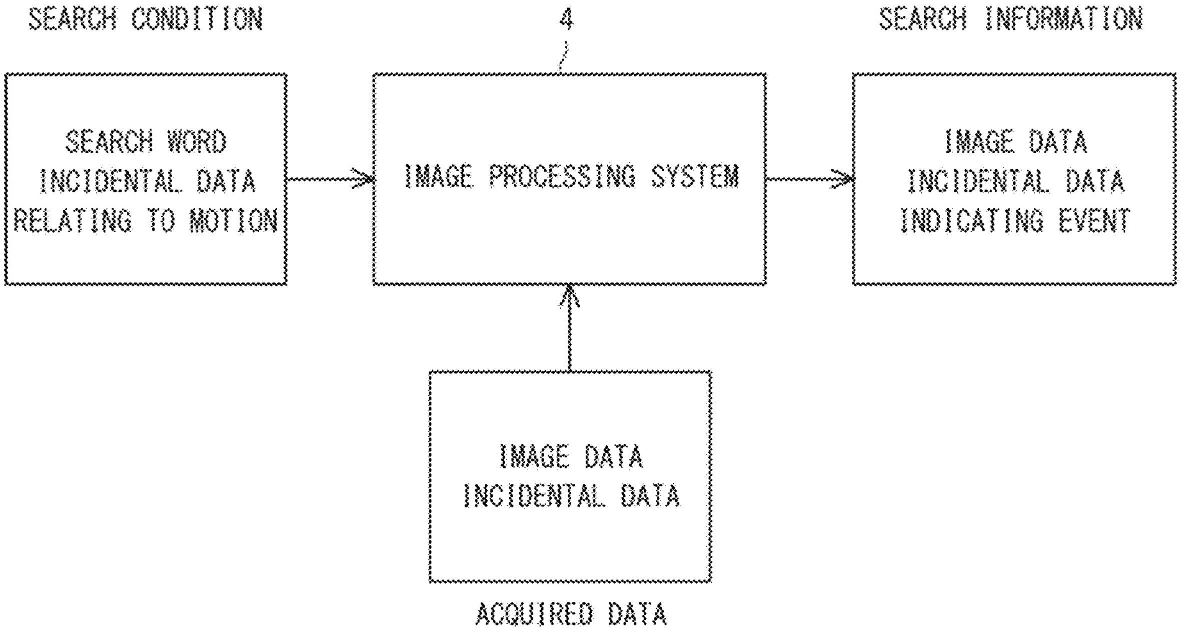
FIG. 16 is a diagram illustrating search processing in an image processing system according to the fourth example embodiment.

FIG. 16 is a diagram illustrating search processing in the image processing system according to the fourth example embodiment. FIG. 16 illustrates information input to the image processing system 4 and data to be output by the image processing system 4 in accordance with the input data.

The image processing system 4 receives, as a search condition, a search word indicating an event included in the registered motion database illustrated in FIG. 15 and the incidental data thereof. These search conditions are supplied from the management terminal 80 to the image processing system 4. Alternatively, the search word may be a phrase that can be associated with an event in the registered motion database illustrated in FIG. 15. The image processing system 4 acquires the image data photographed by the photographing apparatus 90 as the acquired data and incidental data thereof.

With the configuration described above, the image processing system 4 receives, for example, a search word of "snatch-and-grab" from the management terminal 80, and responds to the management terminal 80 with image data including an image of a motion related to "snatch-and-grab" from the acquired image data. Alternatively, the image processing system 4 responds to the management terminal 80 with data relating to a location and a date and time at which an image falling under "snatch-and-grab" is photographed, as information incidental to the detected motion. As described above, the search information reception unit 207 in the present example embodiment receives, as the search information, a search word indicating a predetermined event caused by an action of a person. The detection unit 114 of the first terminal 130 and the detection unit 204 of the second terminal 220 detect an image of a person corresponding to the search word as the event. According to the above configuration, the image processing system 4 can detect a predetermined event identified based on skeletal data of at least two persons simultaneously appearing in the image. Therefore, the image processing system 4 can detect not only simple posture such as falling but also a complicated situation such as a snatch-and-grab or a fight.

The fourth example embodiment has been described above. In the image processing system 4 according to the fourth example embodiment, at least one of the first terminal 130 or the second terminal 220 may include storage means that stores predetermined reference data regarding the posture of the person. In the configuration described above, when the first terminal 130 performs the detection of a predetermined event from the acquired image data and the second terminal 220 does not perform the analysis of the image data, the second terminal 200 may not include the extraction unit 202, the analysis unit 203, and the detection unit 204, for example. In this case, the second terminal 220 may have a function of acquiring a result of each event detected by the first terminal 130 and aggregating the acquired results. As described above, according to the fourth example embodiment, it is possible to provide an image processing system and the like capable of efficiently processing an image photographed by a camera. In addition, even in a case where a large number of cameras are installed over a wide area, the image processing system and the like can efficiently process images acquired by capturing images of various locations in the wide area.

<Modification of Example Embodiment>

Figure 17:
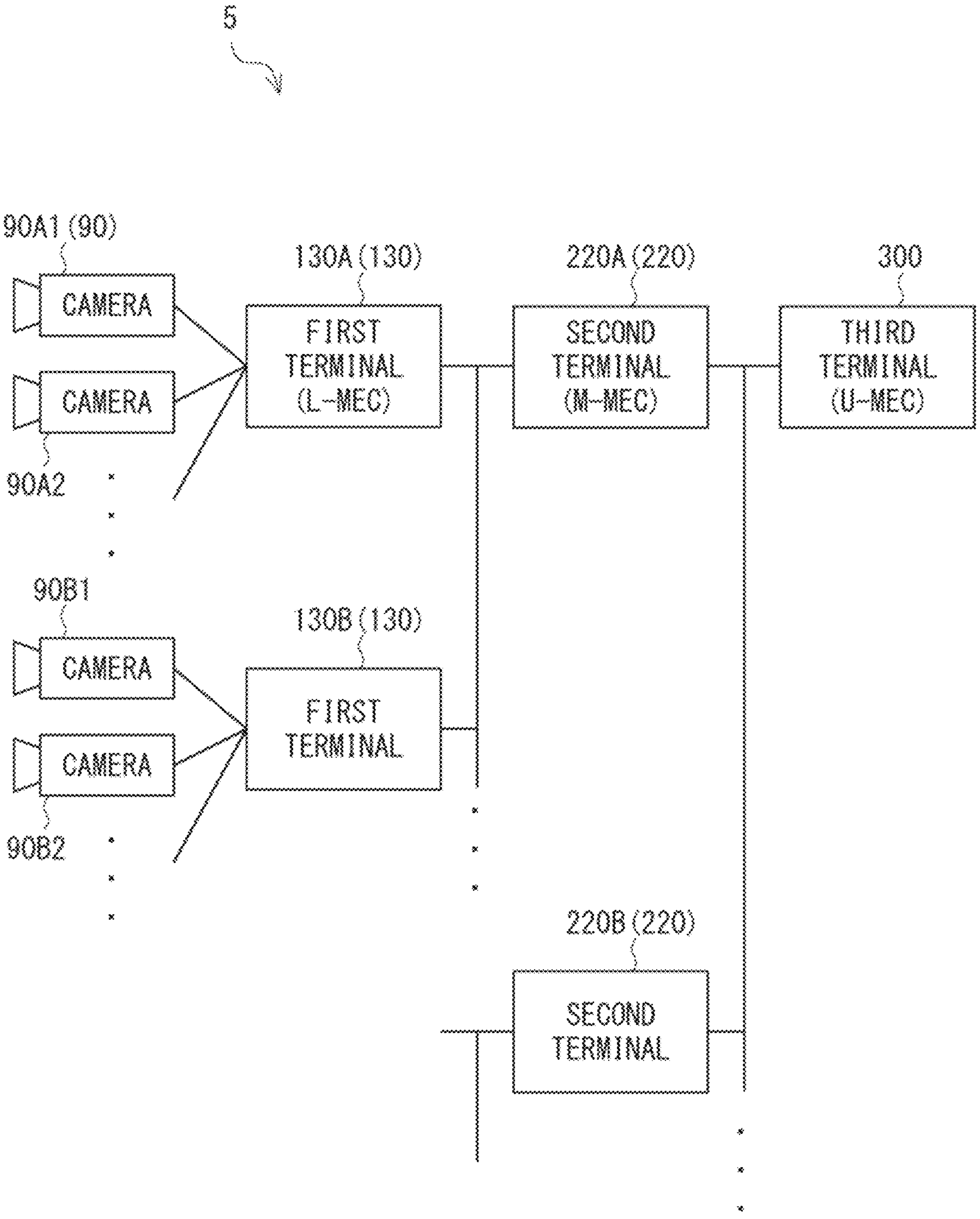
FIG. 17 is a block diagram illustrating a variation of a configuration of an image processing system.

FIG. 17 is a block diagram illustrating a variation of the configuration of the image processing system. FIG. 17 illustrates an image processing system 5. The image processing system 5 includes a first terminal 130, a second terminal 220, and a third terminal 300. In the image processing system 5, the first terminal 130, the second terminal 220, and the third terminal 300 are terminals each called a multi-access edge computing (MEC). Herein, for example, the first terminal 130 may be referred to as a lower-MEC (L-MEC), the second terminal 220 may be referred to as a middle-MEC (M-MEC), and the third terminal 300 may be referred to as an upper-MEC (U-MEC).

The first terminal 130 acquires image data from a plurality of photographing apparatuses 90. The first terminal 130 performs predetermined first processing on image data acquired from the photographing apparatus 90. The predetermined first processing is the preprocessing described above and processing of detecting predetermined skeletal data. The first terminal 130 performs such first processing and then supplies first processing data to the second terminal 220.

The second terminal 220 receives the first processing data from the plurality of first terminals 130, and performs second processing by using the received plurality of pieces of first processing data. The second processing is processing of aggregating the first processing data or processing of detecting predetermined skeletal data from the first processing data. The second terminal 220 performs the second processing and supplies second processing data to the third terminal 300.

The third terminal 300 receives the second processing data from the plurality of second terminals 220, and performs third processing by using the received plurality of pieces of second processing data. The third processing may be, for example, processing of aggregating the second processing data, or processing of further detecting predetermined skeletal data from the second processing data. The third terminal 300 may be communicably connected to a predetermined management terminal.

The modification of the example embodiment has been described above. The modification which has been described here can be applied to any of the above-described image processing systems. By disposing a terminal having such a cascade-shaped processing configuration in a distributed manner, the image processing system 5 can further suppress delay and perform image processing efficiently. Further, even when a large number of cameras are installed over a wide area by such a distributed system or a cascade-shaped system, the image processing system or the like can efficiently process images acquired by capturing images of various locations in the wide area.

Although the example embodiments of the present invention have been described above, these are examples of the present invention, and various configurations other than the above may be adopted. The configurations of the example embodiments described above may be combined with each other, or some of the configurations may be replaced with another configuration. Further, the configurations of the example embodiments described above may be variously modified within a range not departing from the gist. Further, the configurations and processes disclosed in the example embodiments described above and modifications may be combined with each other.

Further, in the plurality of flowcharts used in the above explanation, a plurality of steps (processing) are described in order, but an execution order of the steps executed in each example embodiment is not limited to the order described. In each of the example embodiments, the order of the illustrated steps can be changed within a range that does not interfere with the functions achieved by the present example embodiment. Further, the example embodiments described above can be combined within a range in which the contents do not conflict with each other.

<Example of Hardware Configuration>

Hereinafter, a case where each functional configuration of a determination apparatus in the present disclosure is achieved by a combination of hardware and software will be described.

Figure 18:
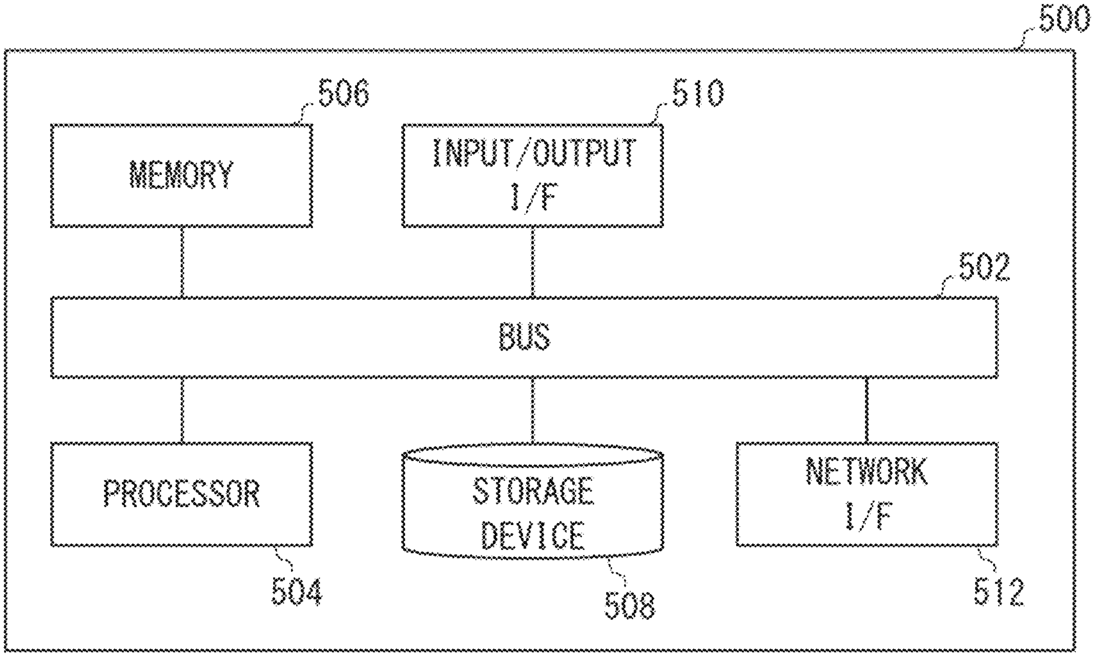
FIG. 18 is a block diagram illustrating by an example a hardware configuration of a computer.

FIG. 18 is a block diagram illustrating a hardware configuration of a computer. The determination apparatus according to the present disclosure can achieve the above-described functions by a computer 500 including the hardware configuration illustrated in the drawing. The computer 500 may be a portable computer such as a smartphone or a tablet terminal, or may be a stationary computer such as a PC. The computer 500 may be a dedicated computer designed to achieve each apparatus, or may be a general-purpose computer. The computer 500 can achieve a desired function by installing a predetermined application.

The computer 500 includes a bus 502, a processor 504, a memory 506, a storage device 508, an input/output interface 510 (interface is also referred to as Interface (I/F)), and a network interface 512. The bus 502 is a data transmission path through which the processor 504, the memory 506, the storage device 508, the input/output interface 510, and the network interface 512 transmit and receive data to and from each other. However, a method of connecting the processors 504 and the like to each other is not limited to the bus connection.

The processor 504 is various processors such as a CPU, a GPU, or an FPGA. The memory 506 is a main storage apparatus achieved by using a random access memory (RAM) or the like.

The storage device 508 is an auxiliary storage apparatus achieved by using a hard disk, an SSD, a memory card, a read only memory (ROM), or the like. The storage device 508 stores a program for achieving a desired function. The processor 504 reads the program into the memory 506 and executes the program, thereby achieving each functional component of each apparatus.

The input/output interface 510 is an interface for connecting the computer 500 and an input/output device. For example, an input apparatus such as a keyboard or an output apparatus such as a display apparatus is connected to the input/output interface 510.

The network interface 512 is an interface for connecting the computer 500 to a network.

Although an example of the hardware configuration in the present disclosure has been described above, the example embodiments described above are not limited thereto. The present disclosure can also achieve any processing by causing a processor to execute a computer program.

In the examples described above, the program includes instructions (or software codes) that, when loaded into a computer, cause the computer to perform one or more of the functions described in the example embodiments. The program may be stored in a non-transitory computer-readable medium or a tangible storage medium. By way of example, and not limitation, computer-readable media or tangible storage media include a random-access memory (RAM), a read-only memory (ROM), a flash memory, a solid-state drive (SSD) or other memory techniques, a CD-ROM, a digital versatile disc (DVD), a Blu-ray (registered trademark) disk or other optical disk storage, a magnetic cassette, a magnetic tape, a magnetic disk storage, or other magnetic storage devices. The program may be transmitted on a transitory computer readable medium or a communication medium. By way of example, and not limitation, transitory computer-readable media or communication media include electrical, optical, acoustic, or other forms of propagated signals.

Some or all of the example embodiments described above may be described as the following supplementary notes, but are not limited thereto.

(Supplementary Note 1)

An image processing system including a first terminal and a second terminal that are communicably connected to each other, wherein the first terminal includes image data acquisition means for acquiring image data related to an image of a predetermined space from a camera that photographs the predetermined space, at least one of the first terminal or the second terminal includes analysis means for analyzing whether skeletal data relating to a structure of a body of a person included in the image are similar to predetermined reference skeletal data, and the second terminal includes:

detection means for detecting a predetermined event based on a result of the analysis; and output means for outputting result information that is a result of the detection.

(Supplementary Note 2)

The image processing system according to supplementary note 1, wherein the detection means performs detection of the predetermined event based on the skeletal data of at least two persons simultaneously included in the image.

(Supplementary Note 3)

The image processing system according to supplementary note 1 or 2, wherein at least one of the first terminal or the second terminal further includes storage means for storing predetermined reference data relating to posture of a person.

(Supplementary Note 4)

The image processing system according to any one of supplementary notes 1 to 3, wherein the second terminal includes the analysis means, and the first terminal supplies preprocessing data acquired by performing predetermined preprocessing on the image data to the second terminal.

(Supplementary Note 5)

The image processing system according to supplementary note 4, wherein, as the preprocessing, the first terminal generates extracted image data acquired by extracting a person image including a person among the images, and supplies the extracted image data to the second terminal.

(Supplementary Note 6)

The image processing system according to supplementary note 4 or 5, wherein, as the preprocessing, the first terminal sets a first resolution of the image when a number of persons included in the image is less than a threshold value to become lower than a second resolution of the image when the number of persons included in the image is equal to or more than the threshold value, and supplies resultant data to the second terminal.

(Supplementary Note 7)

The image processing system according to any one of supplementary notes 1 to 3, wherein the first terminal includes:

first extraction means for generating extracted image data acquired by extracting a first person image from the image data; and first analysis means for analyzing whether the first person image is similar to first reference skeletal data, and generating first analysis result information, the second terminal includes:

second extraction means for generating extracted image data acquired by extracting a second person image from the image data; and second analysis means for analyzing whether the second person image is similar to second reference skeletal data, and generating second analysis result information, and the detection means performs detection of the event based on the first analysis result information and the second analysis result information.

(Supplementary Note 8)

The image processing system according to any one of supplementary notes 1 to 3, wherein the first terminal includes:

first extraction means for generating extracted image data acquired by extracting a person image from the image data; and analysis means for analyzing whether the person image is similar to the reference skeletal data, and generating first analysis result information, and the second terminal performs detection of the event based on a plurality of pieces of first analysis result information acquired from a plurality of the first terminals.

(Supplementary Note 9)

The image processing system according to any one of supplementary notes 1 to 8, wherein the second terminal further includes search information reception means for receiving predetermined search information relating to posture or an action of a person, the analysis means sets the reference skeletal data corresponding to posture related to the search information, and analyzes whether the reference skeletal data are similar to the skeletal data related to the image, and the detection means detects the event corresponding to the search information based on a result of the analysis.

(Supplementary Note 10)

The image processing system according to supplementary note 9, wherein the search information reception means receives the search information indicating the posture of the person, and the detection means detects an image of a person corresponding to the posture indicated by the search information as the event.

(Supplementary Note 11)

The image processing system according to supplementary note 9, wherein the search information reception means receives a search word indicating a predetermined event caused by an action of a person as the search information, and the detection means detects an image of a person corresponding to the search word as the event.

(Supplementary Note 12)

An image processing method to be executed by an image processing system including a first terminal and a second terminal that are communicably connected to each other, the image processing method including:

by the first terminal, acquiring image data related to an image of a predetermined space from a camera that photographs the predetermined space:

by at least one of the first terminal or the second terminal, analyzing whether skeletal data relating to a structure of a body of a person included in the image are similar to predetermined reference skeletal data:

by the second terminal, detecting a predetermined event based on a result of the analysis; and outputting result information that is a result of the detection.

(Supplementary Note 13)

A non-transitory computer-readable medium storing a program causing an image processing system to execute an image processing method, the image processing system including a first terminal and a second terminal that are communicably connected to each other, the image processing method including:

by the first terminal, acquiring image data related to an image of a predetermined space from a camera that photographs the predetermined space:

by at least one of the first terminal or the second terminal, analyzing whether skeletal data relating to a structure of a body of a person included in the image are similar to predetermined reference skeletal data;

by the second terminal, detecting a predetermined event based on a result of the analysis; and outputting result information that is a result of the detection.

REFERENCE SIGNS LIST

1, 2, 3, 4, 5 IMAGE PROCESSING SYSTEM
10 FIRST TERMINAL
11 IMAGE DATA ACQUISITION UNIT
20 SECOND TERMINAL
21 ANALYSIS UNIT
22 DETECTION UNIT
23 OUTPUT UNIT
80 MANAGEMENT TERMINAL
90 PHOTOGRAPHING APPARATUS
91 PHOTOGRAPHING UNIT
92 PHOTOGRAPHING CONTROL UNIT
93 CAMERA COMMUNICATION UNIT
100 FIRST TERMINAL
101 IMAGE DATA ACQUISITION UNIT
102 PREPROCESSING UNIT
103 FIRST COMMUNICATION UNIT
112 EXTRACTION UNIT
113 ANALYSIS UNIT
114 DETECTION UNIT
115 OUTPUT UNIT
120 STORAGE UNIT
121 REGISTERED MOTION DATABASE
130 FIRST TERMINAL
200 SECOND TERMINAL
201 IMAGE DATA ACQUISITION UNIT
202 EXTRACTION UNIT
203 ANALYSIS UNIT
204 DETECTION UNIT
205 OUTPUT UNIT
206 SECOND COMMUNICATION UNIT
207 SEARCH INFORMATION RECEPTION UNIT
210 STORAGE UNIT
220 SECOND TERMINAL
211 REGISTERED MOTION DATABASE
300 THIRD TERMINAL
500 COMPUTER
504 PROCESSOR
506 MEMORY

508 STORAGE DEVICE
510 INPUT/OUTPUT INTERFACE
512 NETWORK INTERFACE
N1 NETWORK

What is claimed is:

1. An image processing system comprising a first terminal and a second terminal that are communicably connected to each other, wherein each of the first terminal and the second terminal comprises:

at least one memory storing instructions; and at least one processor, the at least one processor of the first terminal is configured to execute the instructions to acquire image data related to an image of a predetermined space from a camera that photographs the predetermined space, and the at least one processor of the second terminal is configured to execute the instructions to:

analyze whether skeletal data relating to a structure of a body of a person included in the image are similar to predetermined reference skeletal data;

detect a predetermined event based on a result of the analysis; and output result information that is a result of the detection, wherein, as preprocessing, the at least one processor of the first terminal is configured to execute the instructions to set a first resolution of the image when a number of persons included in the image is less than a threshold value to become lower than a second resolution of the image when the number of persons included in the image is equal to or more than the threshold value, and supply resultant data to the second terminal.

2. The image processing system according to claim 1, wherein the at least one processor of the second terminal is configured to execute the instructions to perform detection of the predetermined event based on the skeletal data of at least two persons simultaneously included in the image.

3. The image processing system according to claim 1, wherein the at least one processor of at least one of the first terminal or the second terminal is further configured to execute the instructions to store predetermined reference data relating to posture of a person.

4. The image processing system according to claim 1, wherein, as the preprocessing, the at least one processor of the first terminal is configured to execute the instructions to generate extracted image data acquired by extracting a person image including a person among the images, and supply the extracted image data to the second terminal.

5. The image processing system according to claim 1, wherein the at least one processor of the first terminal is configured to execute the instructions to:

generate extracted image data acquired by extracting a first person image from the image data; and analyze whether the first person image is similar to first reference skeletal data, and generate first analysis result information, the at least one processor of the second terminal is configured to execute the instructions to:

generate extracted image data acquired by extracting a second person image from the image data;

analyze whether the second person image is similar to second reference skeletal data, and generate second analysis result information; and perform detection of the event based on the first analysis result information and the second analysis result information.

6. The image processing system according to claim 1, wherein the at least one processor of the first terminal is configured to execute the instructions to:

generate extracted image data acquired by extracting a person image from the image data; and analyze whether the person image is similar to the reference skeletal data, and generate first analysis result information, and the at least one processor of the second terminal is configured to execute the instructions to perform detection of the event based on a plurality of pieces of first analysis result information acquired from a plurality of the first terminals.

7. An image processing method to be executed by an image processing system including a first terminal and a second terminal that are communicably connected to each other, the image processing method comprising:

by the first terminal, acquiring image data related to an image of a predetermined space from a camera that photographs the predetermined space;

by at least one of the first terminal or the second terminal, analyzing whether skeletal data relating to a structure of a body of a person included in the image are similar to predetermined reference skeletal data;

by the second terminal, detecting a predetermined event based on a result of the analysis; and outputting result information that is a result of the detection, wherein by the second terminal, receiving predetermined search information relating to posture or an action of a person, wherein by at least one of the first terminal or the second terminal, setting the reference skeletal data corresponding to posture related to the search information, and analyzing whether the reference skeletal data are similar to the skeletal data related to the image, and wherein by the second terminal, detecting the event corresponding to the search information based on a result of the analysis.

8. The image processing method according to claim 7, wherein the image processing method further comprises:

by the second terminal, receiving the search information indicating the posture of the person; and detecting an image of a person corresponding to the posture indicated by the search information as the event.

9. The image processing method according to claim 7, wherein the image processing method further comprises:

by the second terminal, receiving a search word indicating a predetermined event caused by an action of a person as the search information; and detecting an image of a person corresponding to the search word as the event.

10. An image processing method to be executed by an image processing system including a first terminal and a second terminal that are communicably connected to each other, the image processing method comprising:

by the first terminal, acquiring image data related to an image of a predetermined space from a camera that photographs the predetermined space;

by the second terminal, analyzing whether skeletal data relating to a structure of a body of a person included in the image are similar to predetermined reference skeletal data;

detecting a predetermined event based on a result of the analysis; and outputting result information that is a result of the detection, wherein, as preprocessing, by the first terminal, setting a first resolution of the image when a number of persons included in the image is less than a threshold value to become lower than a second resolution of the image when the number of persons included in the image is equal to or more than the threshold value, and supplying resultant data to the second terminal.

* * * * *